2,917,827
CONTINUOUS FLOW CHEESE MAKING APPARATUS

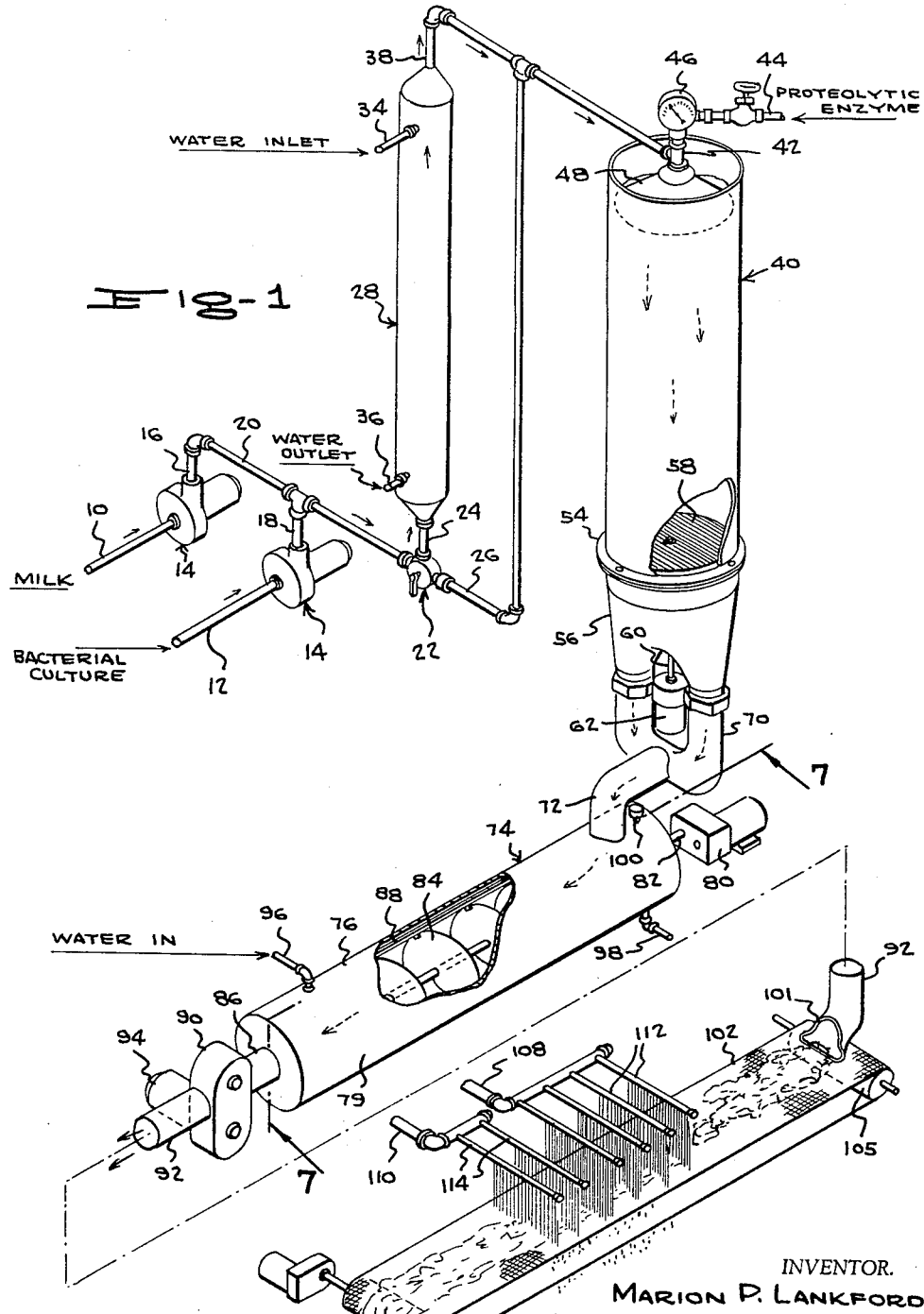

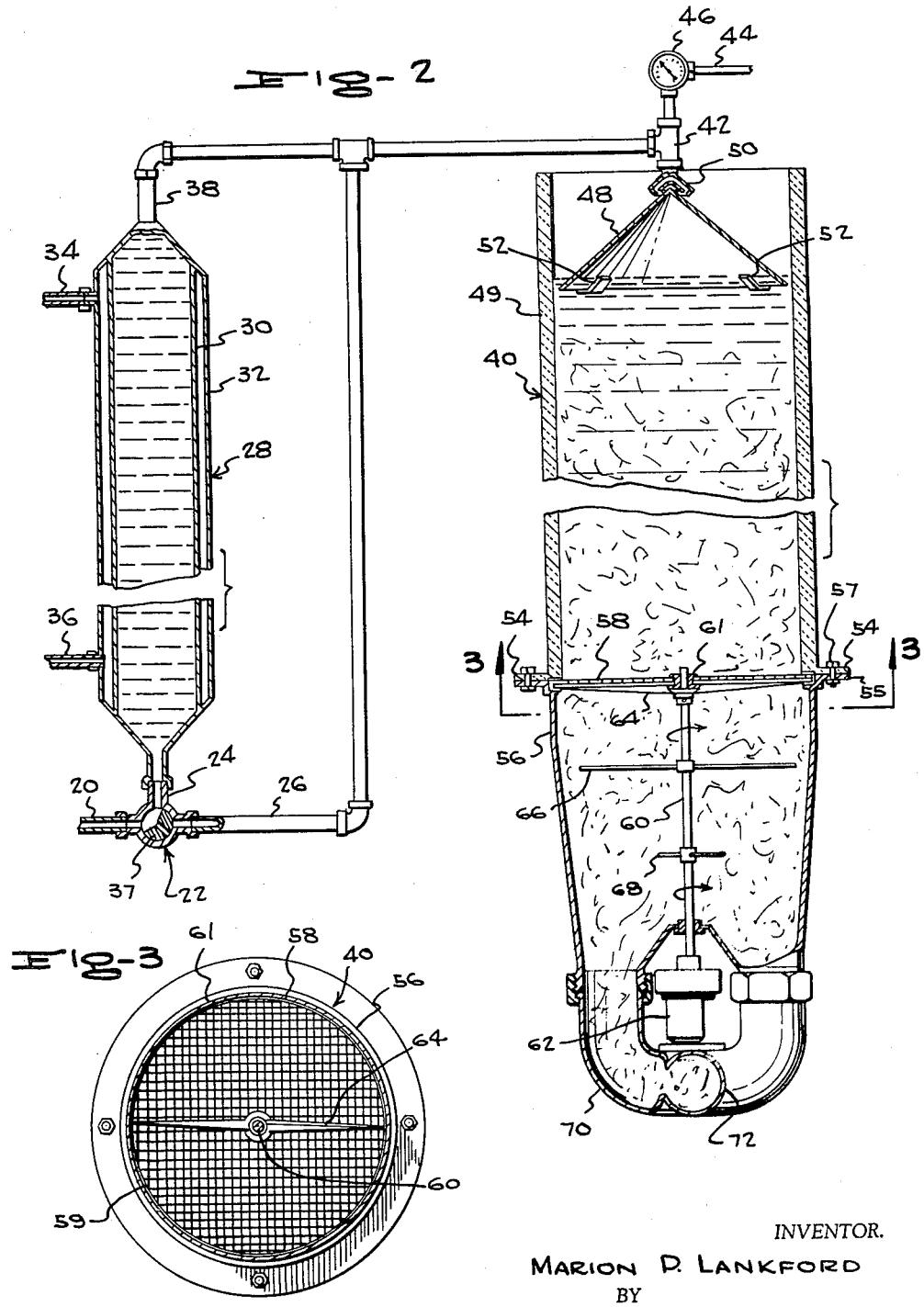

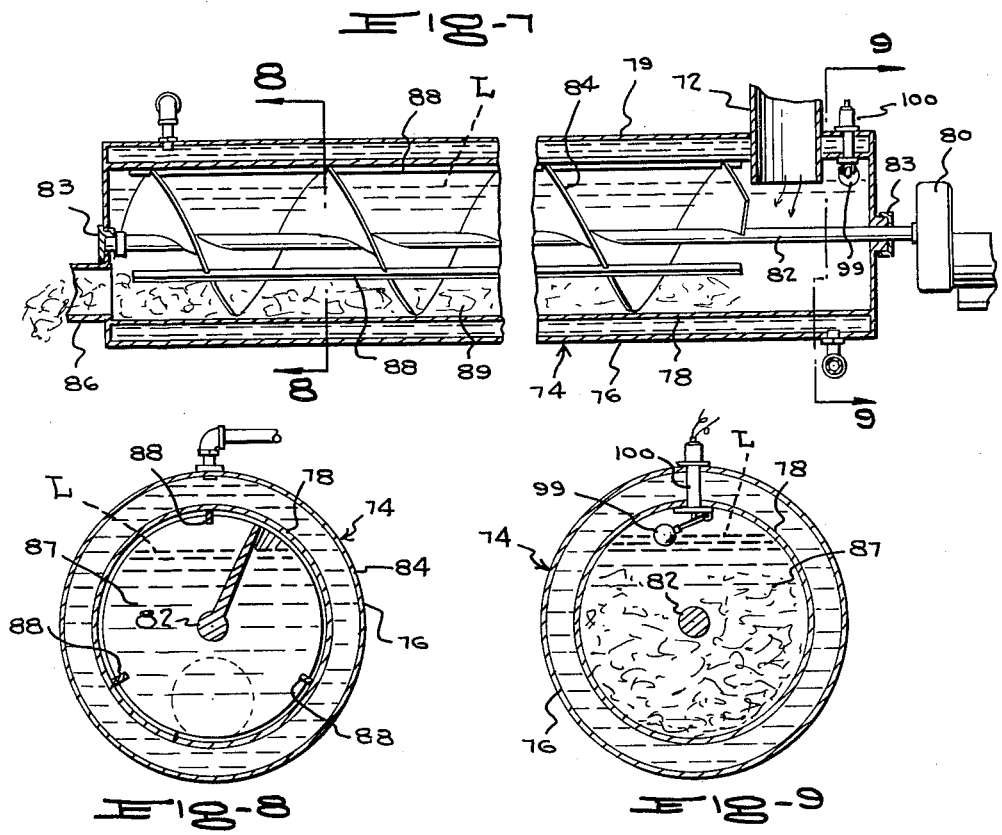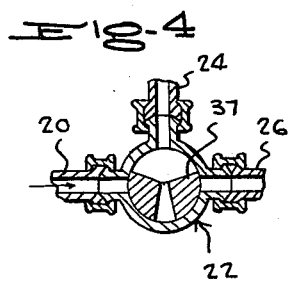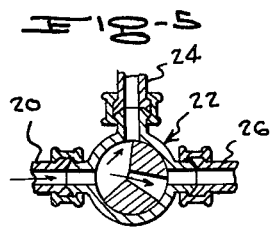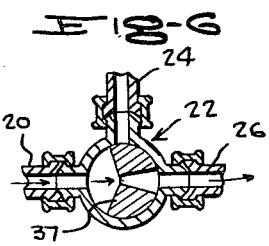

Marion P. Lankford, Mendota, Ill.

Application February 14, 1958, Serial No. 715,289

14 Claims. (Cl. 31—46)

This invention relates generally to the commercial production of cheeses, and more particularly to an apparatus usable for the manufacture of cottage cheese curd from skim milk, and further usable, with certain minor alterations, for the manufacture of several other kinds of cheese, including Cheddar cheese.

The invention will be described with particular reference to the manufacture of cottage cheese curd on a commercial scale, for the purpose of showing the construction and operation of the apparatus. However, as will be apparent from the illustration and description included in this application, the invention is usable also, as above noted, for the manufacture of various other types of cheeses.

The invention has, as one important object, the provision of a truly continuous, gravitational control of cheese manufacture. Heretofore, it has been proposed to provide so-called "continuous flow" cheese making apparatuses. However, these have not been truly continuous, in that for example, they may involve in actuality a continuously revolving series of identical but separate batches, resulting in an intermittent discharge of the finished product. The present invention, accordingly, has as an important object the provision of a truly continuously producing cheese making assembly.

A further important object is to provide a device of the character stated wherein there will be a continuous flow of bacteria culture, in a manner such as to allow the continuous process to be carried out efficiently and uniformly, and further permit, in a manner to be made presently apparent, a positive acceleration of the coagulation process produced by propagation of the bacteria.

Other objects will appear from the following description, the claims appended thereto, and from the annexed drawings in which like reference characters designate like parts throughout the several views and wherein:

Figure 1 is a somewhat diagrammatic perspective view showing the complete apparatus, portions being broken away;

Figure 2 is an enlarged vertical sectional view through the primary retaining cylinder and the coagulating chamber of the apparatus;

Figure 3 is a transverse sectional view through the coagulating chamber substantially on line 3—3 of Figure 2;

Figures 4, 5 and 6 are enlarged sectional views of the three-way valve assembly controlling flow of the material to the primary retaining cylinder and bypass;

Figure 7 is an enlarged longitudinal sectional view through the cooking assembly, portions being broken away;

Figure 8 is a transverse sectional view, the scale being enlarged above that of Figure 7, taken substantially on line 8—8 of Figure 7; and Figure 9 is a transverse sectional view on the same scale as Figure 8, substantially on line 9—9 of Figure 7.

Referring to the drawings in detail, and in particular to Figure 1, designated at 10 is a line through which milk is supplied to the apparatus, while at 12 there is shown a line through which bacterial culture is supplied. The milk and the bacterial culture are supplied to pumps 14, and these pump the same through lines 16, 18, into a common supply line 20 extending to the inlet of a three-way valve assembly designated generally at 22 and comprising, per se, a conventional device. Connected to one of the outlets of the valve assembly is a line 24, while to the other outlet there is connected a bypass line 26. Line 24 extends to the lower end of an elongated, vertically disposed primary retaining cylinder or chamber 28 which, as shown in Figure 2, has inner and outer walls 30, 32 defining a jacket surrounding said cylinder. Communicating with the upper and lower ends of the jacket are lines 34, 36 respectively comprising a water inlet and a water outlet. The opposite ends of the cylinder 28 are tapered, and connected to the upper, discharge end of the cylinder is a line 38 into which the bypass 26 opens.

Pumps 14 are positive displacement, variable speed pumps, and can comprise any pumps that will deliver a predetermined amount of fluid in each cycle of operation and that will not permit recirculation. The pumps could be reciprocating piston, meshed gear, or interlocking impeller pumps.

Thus, being positive pumps, the pumps 14 will hold the head pressure within the equipment, whether the pump is in operation or not. Further, the volume of delivered material in each revolution will remain constant. Still further, the input and output of the pumps, in a given period of time, can be fully controlled by regulating the r.p.m. thereof.

It will be understood that any pump that will accomplish the above stated desirable purposes will be satisfactory, and at this time, positive displacement pumps are preferred, though the invention will obviously encompass any type of pump other than this type, if it satisfactorily accomplishes the stated purposes.

Through line 10, as previously noted, will be directed the milk, skimmed milk, cream, reconstituted powdered whole or skimmed milk or any combination of these products.

With respect to the culture directed through line 12, this will be any type of organism required for the manufacture of specific types of cheese, and since these are very well known in the art, there is no need to list the various cultures that would be usable.

However, of importance is the fact that the reaction time (coagulation time) required with the use of this equipment is reduced, by the use of larger volumes of acid and bacteria producing culture media. Whole milk or skimmed milk culture media having a low acidity (.50%–.55%) may be used in large volumes, inasmuch as the milk protein contained in the culture media has not been precipitated out of colloidal suspension. Further, these proteins are precipitated when the entire mass of cheese milk is coagulated. Thus, the protein from the culture media becomes a homogeneous part of the finished cheese.

In this regard, culture media having an acidity of .50%–.55% may be produced in a continuous flow. To this end, an incubation vessel is used to maintain the growth of the bacteria. When the desired acidity is reached, a simultaneous inflow and outflow would be started, at a rate sufficient to maintain the acid concentration at this level. The size of the incubation vessel (not shown) should be sufficient to produce a continuous flow of culture media through line 12, to meet the operational demands of the coagulation chamber 40.

Parenthetically, it may be here noted that the machine can be used under standard cheese making procedures, that is, without using an accelerated starter process. The equipment, in other words, can be used with a standard "starter." Such a starter would have an acidity of .75%–.85% and would amount to a maximum of about 10% to 15% of the volume of the materials going into the manufacture of the cheese. The invention, therefore, is not restricted to the use of an accelerated starter process.

The combined liquids may then be directed upwardly through line 24 into the primary, holding cylinder 28, in which a more complete intermingling of the two liquids is accomplished. Referring to Figure 2, as previously noted this may have a warm water jacket to maintain or adjust the temperature of the milk-culture mixture. Alternatively, a jacket of insulation could be used on the cylinder 28.

To direct the commingled liquids into cylinder 28, valve 22 will be positioned as shown in Figure 2, in which position the valve core 37 is rotated to a position such as to require the complete output of line 22 to flow upwardly into line 24.

Within cylinder 28, the additional function is discharged, of producing, by the action of the culture organisms, an increase in acidity prior to the introduction of the coagulation enzyme. This is particularly important in the manufacture of high acid cheeses.

The cylinder 28 has the further advantage of increasing the production capacity of the coagulation chamber 40.

Bypass line 26 is provided, in the event that an initial acid increase is not demanded due to the fact that the particular type of cheese being made does not call for this, or due to the fact that the original influx of culture is producing sufficient acid to permit the immediate inclusion of proteolytic enzymes.

In this event, the complete outflow of line 20 would pass into the bypass, with the valve core 37 being positioned as in Figure 6.

In Figure 4 the valve core is shown completely closed, while in Figure 5, it is adjusted to a position in which there will be flow both into the bypass 26 and into the cylinder 28. As to this last, this position of the three-way valve core may be desired in the event that the milk-culture mix discharge from the cylinder 28 is too high in acid. By adjusting the valve to the Figure 5 position, a portion of the fluid bypasses the cylinder 28, and has the effect of lowering the acidity of the products passing out of the cylinder 28 into the connecting line 38 that extends between the cylinder 28 and coagulating cylinder 40. Bypass 26 opens into the connecting line 38, also down-stream from the cylinder 28.

Referring to Figures 1 and 2, a proteolytic enzyme feed device 46 meters into the cylinder 40 a precisely measured amount of enzyme, together with a coloring material (a coloring would be used, of course, only in the event that it is desired in the manufacture of the particular cheese). Calcium chloride solution, if used, would be mixed with the proteolytic enzyme and metered in with said enzyme.

In any event, the enzyme passes to the metering device 46 through a line 44, the metering device 46 being a wholly conventional device already known in the art. The enzyme mixes with the milk-culture mixture in a connecting T 42, and is caused to flow onto a distribution cone 48, out of a discharge fitting 50 connected to the outlet of the T and having downwardly divergent branches.

The cone 48 is disposed in the upper end of the cylinder 40, constituting a part of the coagulating cylinder. As will be noted, cone 48 has its periphery very closely spaced from the side wall of the body portion 49 of the cylinder 40, being supported in the upper end portion of the body by angularly spaced, radially inwardly extending support brackets 52 carried by body 49.

The manufacture of almost any type of cheese depends upon maximum quiescence of the body of milk, during the period of coagulation. If this factor is ignored, a poor quality of low yield cheese results.

Therefore, fitting 50 constitutes a nozzle, in close proximity to the apex of cone 48 to cause a trickling discharge of the liquid onto the surface of the cone; a plurality of the branches of the nozzle 50 are used, sufficient to distribute the cheese milk about the apex of the distribution cone in a uniform, even flow which then travels to the periphery of the cone. Here the fluid reaches the fluid level within the coagulation cylinder 40, without dropping downwardly onto said level, in a way that would produce splashing and prevent the maximum quiescence desired.

The cone serves the further purposes of providing for a more complete commingling of ingredients, since the ingredients are distributed at the apex and flow downwardly over a wide area of the cone. The ingredients are caused to spread out over a wide area of entry before actual passage into the fluid already within the cylinder 40, thus causing minimum turbulence. Further, by having the liquid level approximately at the periphery of the distribution cone, the actual entry of fluids into the chamber is achieved in a manner causing a steady, gentle flow that eliminates currents below the immediate point of entry.

Coagulation of the material takes place soon after the same enters the coagulation cylinder 40. The net result is that of a solid mass of cheese making material, quiescent within itself but moving downwardly as a mass by gravitational action, responsive to the removal of the product from the lower end of the cylinder 40.

The use of gravitational force to cause the mass of coagulum to move downwardly is a principal feature of the invention. Its use as a motivating force is instrumental in maintaining the coagulated mass in a quiescent state, until it is caused to pass through a cutter means to be described immediately hereinafter.

Referring to Figure 2, body 49 at its lower end is integrally formed with an outwardly directed, circumferential flange 54, in face-to-face contact with a corresponding flange 55 of an extension portion 56 of the cylinder 40, the flanges being connected by angularly spaced bolts 57. Clampably engaged between the abutting ends of body 49 and extension 56 is a cutter 58 extending transversely of the cylinder, in a plane perpendicular to the length of the cylinder. Cutter 58 (see Figure 3) includes a support ring 59, to which are connected closely spaced wires intersecting in perpendicular relation to each other. This produces a grid, screen, or the like, which has over its full area square holes defined by the crossed wires, through which holes the coagulum must pass, as a result of which the coagulum is cut by the wires and formed into strips of square cross section.

A vertical cutting knife drive shaft 60 is journaled at its upper end in a central bearing 61 mounted in cutter 58, and at its lower end is driven by a gearhead motor 62 which may be of the variable speed type, and which effects rotation of shaft 60 at a selected, slow speed such that a cutting knife 64, extending diametrically of cutter 58 just below the plane of the cutter, will slowly rotate to sever the extruded material in a horizontal direction. In effect, grid 58 and knife 64 cooperate to form small cubes of coagulum.

Secured to shaft 60 and spaced apart axially of the shaft are agitator blades 66, 68 which travel within the cubed coagulum, to keep the particles of curd moving gently, whereby to assist in bringing about the initial release of whey from the particles of curd, to prevent the curd particles from matting together.

At its lower end, extension 56 has downwardly convergent outlet branches 70, leading to a discharge pipe 72 of inverted L-shape (Figure 1), through which the curd passes into a cooker assembly generally designated 74.

Assembly 74 is of elongated, horizontally disposed, cylindrical shape, and as shown in Figure 7, has outer and inner side walls 76, 78, respectively, providing a jacket within which warm water is circulated in a counterflow action, to heat the material passing through the cooker.

Beyond one end of the cylindrical body 79 of the cooker, there is a variable speed, gearhead motor 80, the shaft 82 of which extends axially of and within the body of the cooker, being journaled in bearings 83 provided in the opposite end walls of the cooker, said bearings being of course suitably packed. Secured to the shaft 82 is a feed screw or auger 84, extending the major part of the length of the cooker. In this connection, air space is provided for within the body of the cooker to prevent curd from spiralling around the auger, in a manner that would cause it to reach the discharge tube or outlet 86 of the cooker in too short a time. In other words, the fluid level L, shown to particular advantage in Figures 7, 8 and 9, is kept below the uppermost part of the cooking compartment 87 of the cooking assembly 74.

Secured to the edge of feed screw 84 is a pluarity of elongated, straight bars or slats 88, which extend in parallel relation to shaft 82, and wipe over the surface of the inner side wall 78, to cause a mild dashing or agitating action, while at the same time preventing premature matting of curd during the cooking process. The slats serve the further purpose of scraping the wall 78, to remove any particles of curd which might otherwise tend to adhere to said wall.

Designated at 90 is a positive displacement, variable speed discharge pump, which pumps the cooked material out of the body of the cooker, the discharge pipe 86 being connected to the input side of the pump. The output of the pump passes into a connecting tube 92, and the pump is driven by an electric motor 94.

At 96, 98 are shown water inlet and outlet tubes, respectively, for circulation of water through the cooking assembly. At 100 there is a float-controlled switch, operated by a float 99. The switch, as shown in Figure 9, is so arranged that on raising of the water level beyond a predetermined point, the switch will be operated, the switch having an electrical connection to motor 94, so as to temporarily speed up operation of the pump 90, until the fluid level drops back to the predetermined, desired point, at which time the switch will open and slow down the pump. In this connection, an air release valve, not shown, would also be provided, for the release of gas which may be produced during the cooking process, said gas emanating from the cheese. As soon as the gas rises above a predetermined pressure, the valve would operate to bring the pressure down to the desired point.

The motor 80 drives the auger at a speed synchronous with the inflow of products into the coagulation cylinder 40. In this connection, although a float-operated switch has been illustrated and described, it will be understood that this is not necessarily the arrangement that would be employed commercially, the illustration being intended mainly to show that means is used for maintaining level L at a desired point, and for controlling the discharge and inflow into the cylinder of the cooking device, to assure subjection of the materials to cooking for the desired period of time.

Of course, various types of cheeses require different cooking temperatures, and the temperature will therefore depend largely upon the wishes of the operator, as will also the time within which the cheese is subjected to a cooking action.

Although the cooking assembly is shown in the drawing as one continuous tubular structure, in the case of larger capacity units more than one cooker could be used, with said cookers being connected either in series or in parallel. Alternatively, several shorter sections of a cooking assembly can be placed in close association with each other so that the curd is progressively cooked as it passes through each section.

It will be understood that the discharge pump 90 could if desired be placed between the discharge of the coagulation cylinder 40 and the input of the cooking assembly if the nature of the cheese product being made, or the characteristics of operation, should make this necessary. Obviously, such relocation of the pump would not change the nature of the invention.

In the manufacture of some types of cheese, curd coming from the cooker discharge could go directly to the cheese forms or hoops for completion of the manufacture process. Other types require drainage of whey and then require cheddaring and milling. Still others require whey drainage, water washing, and water drainage before completion.

In the event of cheese manufacture where no curd cooking is required, the curd and whey would be allowed to pass through the cooking equipment without the application of heat, or with the cooking unit removed from the coagulation chamber and the discharge pump installed immediately after the discharge from the coagulation chamber.

When the cooked curd is discharged from the cooker, it passes out of a flared outlet 101 of the tube 92, to be spread across the width of a conveyor belt 102 of close mesh screen material. The material is spread to a depth of several inches, and the whey drains off through the screen.

If the cheese is one in which there is a washed curd, the curd then progresses under a series of water sprays. In this connection, belt 102 is driven by a motor 106, to the shaft of which is connected a drive roller 104, about which belt 102 is trained, the belt also being trained about an idler roller 105.

The water spray means in the illustrated example includes tubes 108, 110 through which water is directed under pressure, said tubes communicating with manifolds from which extend spray heads 112, 114 respectively, having outlets through which the water is directed under pressure.

In the event that a cheddar or matted type of cheese is being made, the screen conveyor would be only long enough to permit drainage of excess whey and preliminary matting. Then, the material would fall upon or be otherwise transferred to a similar heated, conveyor belt of a weave impervious to the passage of the material therethrough, where the matting and cheddaring process would be completed.

From the above, it will be seen that the apparatus is one that permits manufacture of cheese in a continuous flow arrangement, that permits maximum production at a comparatively low cost, in an arrangement that will facilitate the achievement of a uniform, timed manufacturing process not only at the particular stage illustrated and described herein, but at stages before and after this stage, including the stage of preparing raw materials, packing the finished product, etc. An overall reduction in production time, with a concurrent increase in production capacity, is thus achieved.

It will be understood that automatic controls and testing devices are not shown and described herein, since obviously, they can be used wherever desired, and do not in and of themselves constitute part of the present invention. Such controls and testing devices, spotted wherever desired along the path followed by the materials, are of course quite desirable and would unquestionably be used in a commercially installed structure. In addition, provision would be made for temperature and pH readings as necessary, to provide the operator with information as to the manner in which the process is being carried out at any particular moment, but this has not been illustrated since it does not directly affect the product.

Further, of course sanitary fittings of types well known in the art, formed of non-corrosive materials, etc., would be used for substantially all the portions of the apparatus. Again, this is sufficiently obvious as not to require special illustration.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. Apparatus for manufacturing cheese in a continuous flow, comprising: a coagulating cylinder; means upstream from the cylinder, in the sense of the direction of said flow, for continuously supplying a mixture of milk and bacteria culture thereto; means communicating with the first-named means for intermixing a proteolytic enzyme with said mixture, said cylinder being extended generally vertically for gravitational feeding of the mixture therethrough; curd-cutting means at the lower end of the cylinder, the interior of said cylinder, over the full distance between the point at which said mixture is introduced and the curd-cutting means, being free of obstructions and being formed for flow of the mixture therethrough in a quiescent state solely by said gravitational feeding; and means downstream from the curd-cutting means connected with the lower end of the cylinder for leading curd from the lower end of said cylinder at a rate corresponding with the feeding of said mixture thereto, whereby to maintain the cylinder contents at a constant level.

2. Apparatus for manufacturing cheese in a continuous flow, comprising: a coagulating cylinder; means upstream from the cylinder, in the sense of the direction of said flow, for continuously supplying a mixture of milk and bacteria culture thereto, said means including a holding cylinder and a bypass arranged for passage of the mixture through a selected one of the same; means communicating with the first-named means for intermixing a proteolytic enzyme with said mixture, said cylinder being extended generally vertically for gravitational feeding of the mixture therethrough; curd-cutting means at the lower end of the cylinder; and means downstream from the curd-cutting means connected with the lower end of the cylinder for leading curd from the lower end of said cylinder at a rate corresponding with the feeding of said mixture thereto, whereby to maintain the cylinder contents at a constant level.

3. Apparatus for manufacturing cheese in a continuous flow, comprising: a coagulating cylinder; a holding tube and a bypass upstream from the cylinder, in the sense of the direction of said flow, arranged for selective direction of a mixture of milk and bacteria culture to either of the same, said holding tube and bypass being connected in communication with one end of the cylinder; means communicating with the first-named means for intermixing a proteolytic enzyme with said mixture, said cylinder being extended generally vertically with the mixture being directed into the upper end of the same, for gravitational feeding of the mixture therethrough; curd-cutting means at the lower end of the cylinder; and means downstream from the curd-cutting means connected with the lower end of the cylinder for leading curd from the lower end of said cylinder at a rate corresponding with the feeding of said mixture thereto, whereby to maintain the cylinder contents at a constant level.

4. Apparatus for manufacturing cheese in a continuous flow, comprising: a coagulating cylinder; means for continuously supplying a mixture of milk and bacteria culture thereto, including a holding tube and a bypass both of which are connected in communication with one end of the cylinder, and with a common source of milk and bacteria culture, said means further including a valve at the inlet ends of the holding tube and bypass, arranged for directing the mixture selectively into either of the holding tube or bypass, as well as into both of the same; means communicating with the first-named means for intermixing a proteolytic enzyme with said mixture, said cylinder being extended generally vertically with the mixture being directed into the upper end of the same, for gravitational feeding of the mixture therethrough; curd-cutting means at the lower end of the cylinder; and means downstream from the curd-cutting means connected with the lower end of the cylinder for leading curd from the lower end of said cylinder at a rate corresponding with the feeding of said mixture thereto, whereby to maintain the cylinder contents at a constant level.

5. Apparatus for manufacturing cheese in a continuous flow, comprising: a coagulating cylinder; means upstream from the cylinder, in the sense of the direction of said flow, for continuously supplying a mixture of milk and bacteria culture thereto; means communicating with the first-named means for intermixing a proteolytic enzyme with said mixture, said cylinder being extended generally vertically for gravitational feeding of the mixture therethrough; curd-cutting means at the lower end of the cylinder, comprising a first cutter in the form of a grid having crossed wires, said first cutter being extended across the lower end portion of the cylinder so as to cut into strips curd passing therethrough, and a rotary cutting knife mounted adjacent the first cutter and rotating in a plane parallel to that of the first cutter, for cutting said strips into small pieces, the interior of said cylinder, over the full distance between the point at which said mixture is introduced and the curd-cutting means, being free of obstructions and being formed for flow of the mixture therethrough in a quiescent state solely by said gravitational feeding; and means downstream from the curd-cutting means connected with the lower end of the cylinder for leading curd from the lower end of said cylinder at a rate corresponding with the feeding of said mixture thereto, whereby to maintain the cylinder contents at a constant level.

6. Apparatus for manufacturing cheese in a continuous flow, comprising: a coagulating cylinder; means upstream from the cylinder, in the sense of the direction of said flow, for continuously supplying a mixture of milk and bacteria culture thereto; means communicating with the first-named means for intermixing a proteolytic enzyme with said mixture, said cylinder being extended generally vertically for gravitational feeding of the mixture therethrough; curd-cutting means at the lower end of the cylinder, comprising a first cutter in the form of a grid having crossed wires, said first cutter being extended across the lower end portion of the cylinder so as to cut into strips curd passing therethrough, and a rotary cutting knife mounted adjacent the first cutter and rotating in a plane parallel to that of the first cutter, for cutting said strips into small pieces; and means downstream from the curd-cutting means connected with the lower end of the cylinder for leading curd from the lower end of said cylinder at a rate corresponding with the feeding of said mixture thereto, whereby to maintain the cylinder contents at a constant level, said cylinder including, below said knife, a plurality of agitators spaced longitudinally of the cylinder and connected to the knife for rotation conjointly therewith.

7. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; means upstream from the cylinder, in the sense of the direction of said flow for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means downstream from the curd-cutting means connected with the lower end of the cylinder for leading curd from the lower end of said cylinder at a rate corresponding with the feeding of said mixture thereto, whereby to maintain the cylinder contents at a constant level.

8. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; means upstream from the cylinder, in the sense of the direction of said flow, for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means for leading curd from the lower end of said cylinder at a rate corresponding with the feeding of said mixture thereto, whereby to maintain the cylinder contents at a constant level, including a generally horizontally extending, cylindrical cooker connected at its inlet end in communication with the discharge end of the cylinder.

9. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; mean upstream from the cylinder, in the sense of the direction of said flow, for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means for leading curd from the lower end of said cylinder at a rate corresponding with the feeding of said mixture thereto, whereby to maintain the cylinder contents at a constant level, including a generally horizontally extending, cylindrical cooker connected at its inlet end in communication with the discharge end of the cylinder, said cooker including an auger extending axially therein arranged to convey the curd from the inlet to the outlet ends of the cooker.

10. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; means upstream from the cylinder, in the sense of the direction of said flow, for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means for leading curd from the lower end of said cylinder at a rate corresponding with the feeding of said mixture thereto, whereby to maintain the cylinder contents at a constant level, including a generally horizontally extending, cylindrical cooker connected at its inlet end in a communication with the discharge end of the cylinder, said cooker including an auger extending axially therein arranged to convey the curd from the inlet to the outlet ends of the cooker, said auger including a plurality of straight slats connected to the same and extending in parallel relation to the axis of the auger in wiping contact with the wall of the cooker.

11. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; means upstream from the cylinder, in the sense of the direction of said flow, for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means for leading curd from the lower end of said cylinder at a rate corresponding with the feeding of said mixture thereto, whereby to maintain the cylinder contents at a constant level, including a generally horizontally extending, cylindrical cooker connected at its inlet end in communication with the discharge end of the cylinder, said cooker including an auger extending axially therein arranged to convey the curd from the inlet to the outlet ends of the cooker, said auger including a plurality of straight slats connected to the same and extending in parallel relation to the axis of the auger in wiping contact with the wall of the cooker, said last named means further including a pump beyond one end of the cooker adapted to pump the mixture in a direction away from the cylinder following passage of the mixture from the lower end of the cylinder.

12. Apparatus for manufacturing cheese in a continuous flow, comprising: a coagulating cylinder including a vertically disposed, cylindrical body portion having at its lower end means for discharging material passing therethrough, said cylinder including in the upper end thereof a distribution cone; means upstream from the cylinder, in the sense of the direction of said flow, for continuously supplying a mixture of milk and bacteria culture to the apex of said cone, for flow of said mixture downwardly upon the cone to the periphery thereof; means communicating with the first-named means for intermixing a proteolytic enzyme with said mixture prior to impingement of the same against the cone, the vertical position of said cylinder being adapted for gravitational feeding of the mixture therethrough; curd cutting means at the lower end of the cylinder; and means for leading curd from the lower end of said cylinder at a rate corresponding with the feeding of said mixture thereto, whereby to maintain the cylinder contents at a constant level, including a generally horizontally extending, cylindrical cooker, connected at its inlet end in communication with the discharge end of the cylinder, said cooker including an auger extending axially therein arranged to convey the curd from the inlet to the outlet ends of the cooker, said auger including a plurality of straight slats connected to the same and extending in parallel relation to the axis of the auger in wiping contact with the wall of the cooker, said cooker further including means extending inwardly from a wall thereof for maintaining the curd at a constant level within the cooker.

13. Apparatus for manufacturing cheese in a continuous flow, comprising: a coagulating cylinder, means upstream from the cylinder, in the sense of the direction of said flow, for continuously supplying a mixture of milk and bacteria culture thereto; means communicating with the first-named means for intermixing a proteolytic enzyme with said mixture, said cylinder being extended generally vertically for gravitational feeding of the mixture therethrough; curd-cutting means at the lower end of the cylinder; means downstream from the curd-cutting means connected with the lower end of the cylinder for leading curd from the lower end of said cylinder at a rate corresponding with the feeding of said mixture thereto, whereby to maintain the cylinder contents at a constant level; and curd drainage and washing means disposed downstream from the means connected to the lower end of the cylinder and including a conveyor belt mounted in position to receive the discharge from said means connected to the lower end of the cylinder, said belt being formed of a liquid-pervious material over which said curd is distributed.

14. Apparatus for manufacturing cheese in a continuous flow, comprising: a coagulating cylinder, means upstream from the cylinder, in the sense of the direction of said flow, for continuously supplying a mixture of milk and bacteria culture thereto; means communicating with the first-named means for intermixing a proteolytic enzyme with said mixture, said cylinder being extended generally vertically for gravitational feeding of the mixture therethrough; curd-cutting means at the lower end of the cylinder; means downstream from the curd-cutting means connected with the lower end of the cylinder for leading curd from the lower end of said cylinder at a rate corresponding with the feeding of said mixture thereto, whereby to maintain the cylinder contents at a constant level; and curd drainage and washing means disposed downstream from the means connected to the lower end of the cylinder and including a conveyor belt mounted in position to receive the discharge from said means connected to the lower end of the cylinder, said belt being formed of a liquid-pervious material over which said curd is distributed, and a series of water spray nozzles extending adjacent said belt in position to direct spray jets of water against the curd supported upon the belt.

References Cited in the file of this patent

UNITED STATES PATENTS

| | | |
|---|---|---|
| 541,642 | Traiser | June 25, 1895 |
| 2,781,269 | Harper | Feb. 12, 1957 |